(12) United States Patent
Tovar

(10) Patent No.: US 8,955,745 B2
(45) Date of Patent: Feb. 17, 2015

(54) WRISTBAND FOR COMMERCIAL TRANSACTIONS ON MOBILE DEVICES

(71) Applicant: Maria Tovar, San Francisco, CA (US)

(72) Inventor: Maria Tovar, San Francisco, CA (US)

( * ) Notice: Subject to any disclaimer, the term of this patent is extended or adjusted under 35 U.S.C. 154(b) by 0 days.

(21) Appl. No.: 13/932,372

(22) Filed: Jul. 1, 2013

(65) Prior Publication Data

US 2015/0001290 A1    Jan. 1, 2015

(51) Int. Cl.
*G06K 5/00* (2006.01)
*G06Q 20/34* (2012.01)
*A45F 5/00* (2006.01)

(52) U.S. Cl.
CPC . *G06Q 20/34* (2013.01); *A45F 5/00* (2013.01)
USPC .......................................... 235/380; 235/375

(58) Field of Classification Search
CPC .... G06F 1/163; G06Q 20/203; G06Q 20/206; G07C 9/00031; G06K 19/07749; G06K 19/07762; G07F 7/1008
USPC .......... 235/380, 375, 492, 451; 224/165, 164, 224/219
See application file for complete search history.

(56) References Cited

U.S. PATENT DOCUMENTS

| | | | |
|---|---|---|---|
| 5,657,201 A * | 8/1997 | Kochis | 361/679.41 |
| 7,041,032 B1 * | 5/2006 | Calvano | 482/4 |
| 8,356,362 B1 * | 1/2013 | Robertson et al. | 2/16 |
| 2007/0083979 A1 * | 4/2007 | Daniels | 2/160 |
| 2011/0290872 A1 * | 12/2011 | Bock | 235/375 |
| 2011/0314651 A1 * | 12/2011 | Behar et al. | 29/428 |
| 2012/0223143 A1 * | 9/2012 | Turbovich | 235/472.02 |
| 2013/0130743 A1 * | 5/2013 | Lin | 455/557 |

FOREIGN PATENT DOCUMENTS

WO    WO 2006051131 A1 *   5/2006

OTHER PUBLICATIONS

Apple Store—Incase Sports Armband Deluxe for iPhone 4S/4, World Wide Web site http://store.apple.com/us/product/H8023ZM/A/incase-sports-armband-deluxe-for-iphone-4s4, last visited Aug. 28, 2013.
Belkin DualFit Armband, World Wide Web site http://www.belkin.com/us/F8Z674-Belkin/p/P-F8Z674, last visited Aug. 28, 2013.
Belkin Ease-Fit Plus Armband for iPhone5; World Wide Web site http://www.belkin.com/us/p/P-F8W106; last visited Aug. 28, 2013.

(Continued)

*Primary Examiner* — Edwyn Labaze
(74) *Attorney, Agent, or Firm* — Knobbe, Martens, Olson & Bear LLP

(57) ABSTRACT

A wristband for supporting mobile devices is disclosed. The wristband can include an elastic body having an opening sized such that the elastic body securely conforms to an adult human wrist when the wrist is positioned in the opening. The elastic body can have a distal end, a proximal end, an inner side adapted to be disposed on an anterior portion of the wrist, and an outer side adapted to be disposed on a posterior portion of the wrist. A transparent screen can be coupled to the inner side of the elastic body. A pocket can be provided between the screen and the inner side of the elastic body. The pocket can be sized and shaped to receive a mobile device. A port hole can be formed through the wristband. The port hole can be sized and shaped to permit access from the pocket to an interface portion of a card reader.

21 Claims, 12 Drawing Sheets

(56) References Cited

OTHER PUBLICATIONS

Cellies by Andrea Behar, World Wide Web site http://www.mycellies.com/overview.asp; last visited Aug. 28, 2013.

iLuv—Innovative Lifestyle Unquestionable Value, World Wide Web site http://www.iluv.com/product_list.asp?page=2&icd=iCA7A323&pcd=12241&code2=C020601; last visited Aug. 28, 2013.

Phubby the Phone Cubby, World Wide Web site http://www.phubby.com/wrist-cubby.html, last visited Aug. 28, 2013.

* cited by examiner

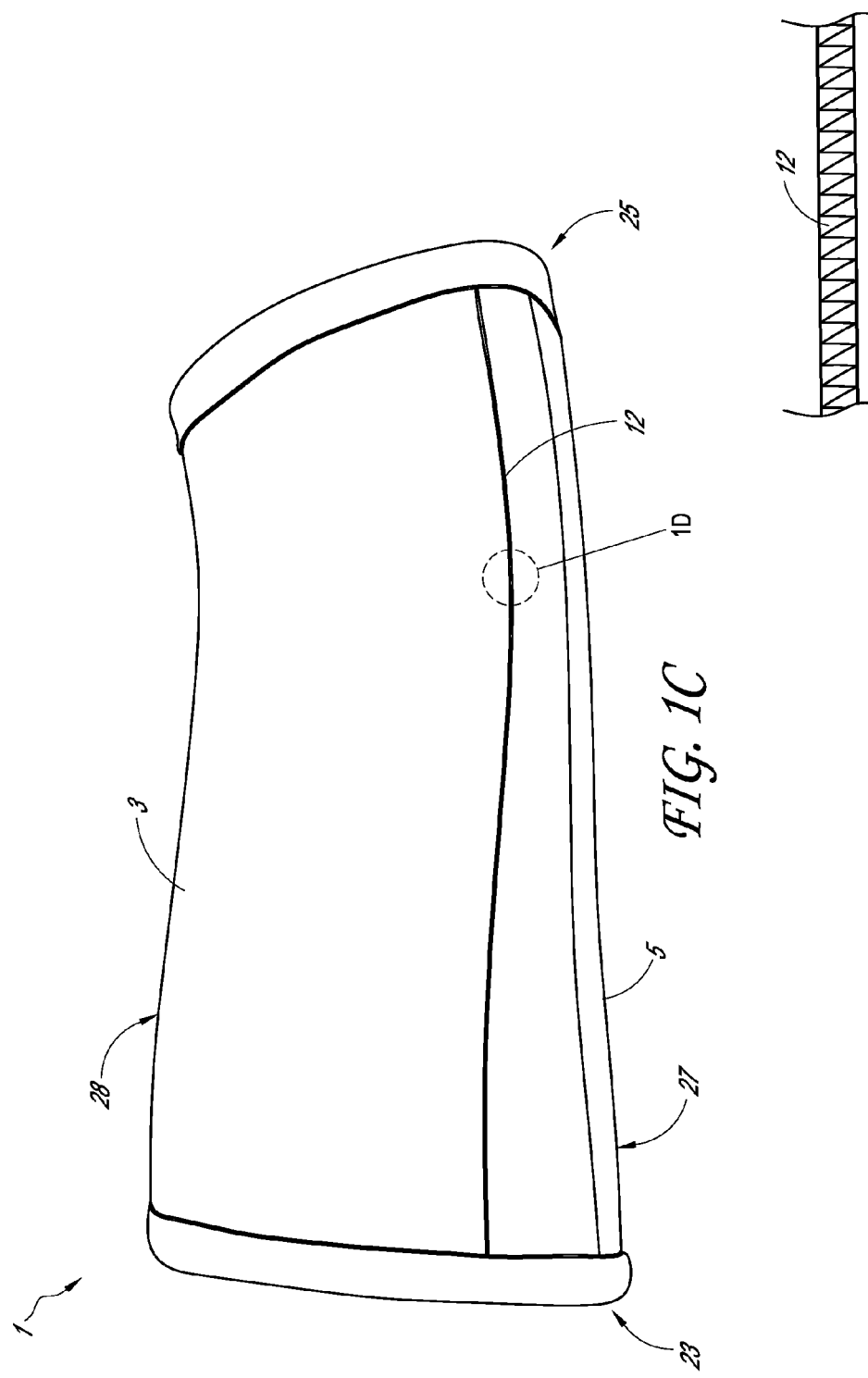

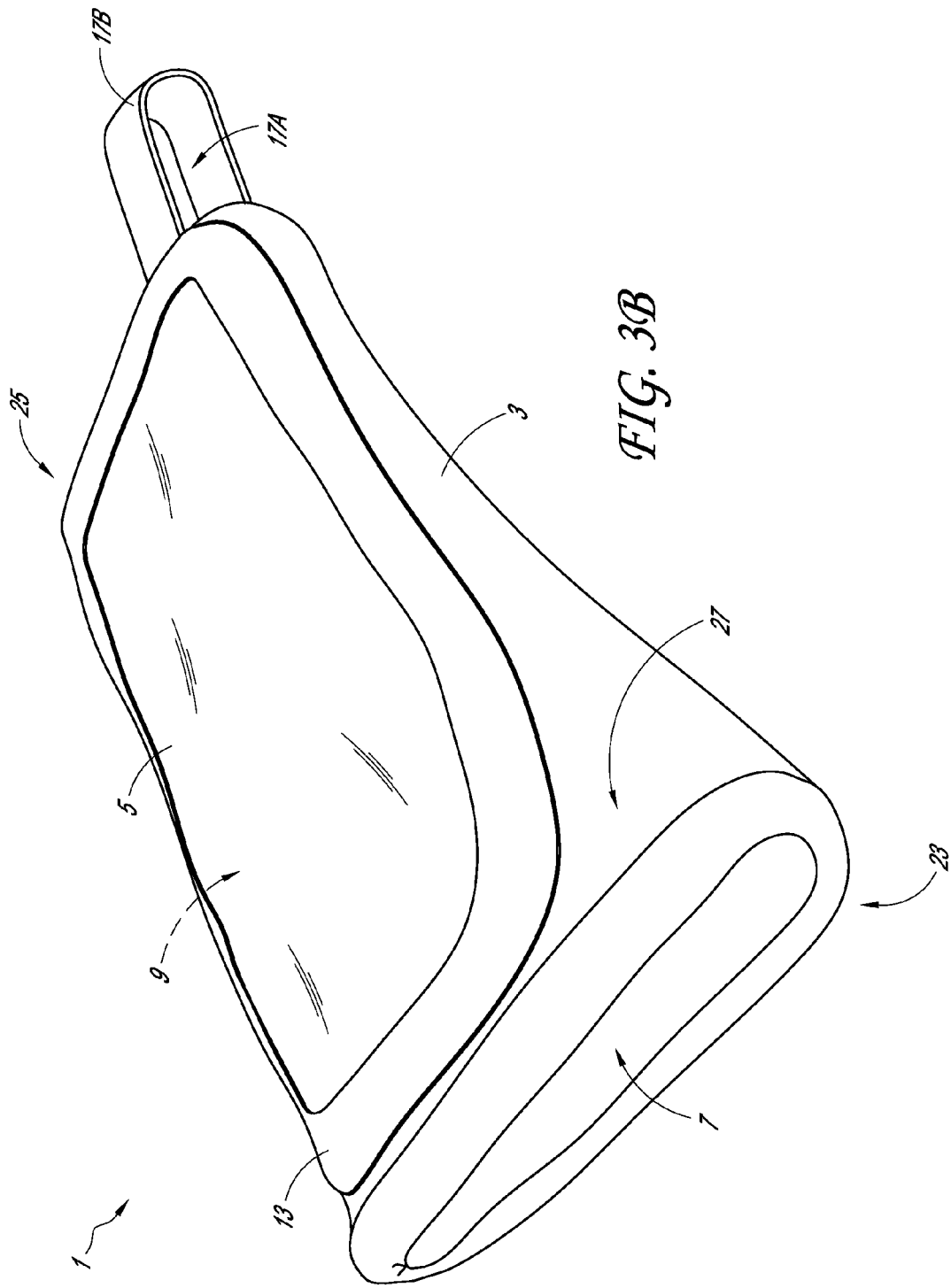

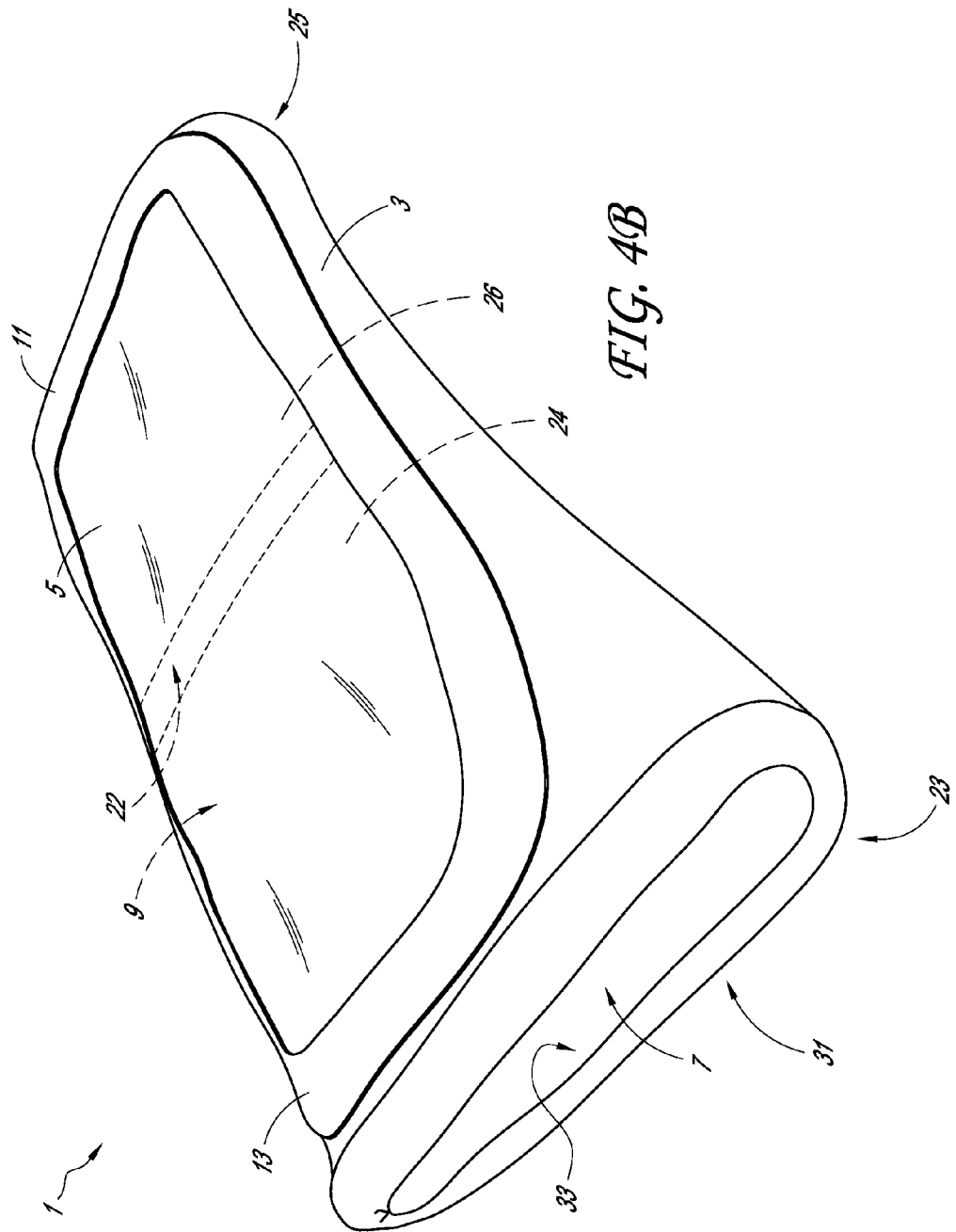

WRISTBAND FOR COMMERCIAL TRANSACTIONS ON MOBILE DEVICES

BACKGROUND OF THE INVENTION

1. Field of the Invention

The invention relates generally to a wristband for use in commercial transactions on mobile devices.

2. Description of the Related Art

Mobile devices, such as mobile smartphones, tablets, etc., are increasingly being used by businesses and organizations to process payments made at the point of sale. Various mobile devices can be electrically and mechanically coupled to a card reader configured to read a payment card and transmit payment information between the payment card and the mobile device. For example, during a transaction, a user can swipe a payment card using the card reader. The card reader can transmit payment information to the mobile device, and the user can process the sale and the payment information on the mobile device. Payment information can be transmitted wirelessly to the payment card provider, financial institutions, server(s) managed or operated by the user, and/or any other suitable recipient of the payment information.

SUMMARY

In one embodiment, a wristband for supporting mobile devices is disclosed. The wristband can include an elastic body having an opening sized such that the elastic body securely conforms to a human wrist when the wrist is positioned in the opening. The elastic body can have a distal end, a proximal end, an inner side adapted to be disposed on an anterior portion of the wrist, and an outer side adapted to be disposed on a posterior portion of the wrist. A transparent screen can be coupled to the elastic body. The wristband can further include a pocket between the screen and the elastic body. The pocket can be sized and shaped to receive a mobile device. A port hole can be formed through the wristband. The port hole can be sized and shaped to permit access from the pocket to an interface portion of a card reader that is configured to read a payment card and to electronically communicate with the mobile device to process a payment made using the payment card.

In another embodiment, a wristband for supporting mobile devices is disclosed. The wristband can include an elastic body having an opening sized such that the elastic body securely conforms to a human wrist when the wrist is positioned in the opening. The elastic body can have a distal end, a proximal end, an inner side adapted to be disposed on an anterior portion of the wrist, and an outer side adapted to be disposed on a posterior portion of the wrist. A transparent screen can be coupled to the elastic body. The wristband can include a pocket between the screen and the elastic body, the pocket sized and shaped to receive a mobile device. A thumb hole can be formed near the distal end of the elastic body. The thumb hole can be sized and shaped to receive a thumb of a hand to further secure the elastic body to the wrist.

In yet another embodiment, a wristband for supporting mobile devices is disclosed. The wristband can include an elastic body having an opening sized such that the elastic body securely conforms to a human wrist when the wrist is positioned in the opening. The elastic body can have a distal end, a proximal end, an inner side adapted to be disposed on an anterior portion of the wrist, and an outer side adapted to be disposed on a posterior portion of the wrist. A transparent screen can be coupled to the elastic body. The wristband can include a pocket between the screen and the elastic body, the pocket sized and shaped to receive a mobile device. The wristband can also include an access aperture that provides access to the pocket, the access aperture formed through a thickness of the elastic body.

In another embodiment, a method for processing a payment using a mobile device is disclosed. The method can include applying a wristband around a human wrist. A mobile device can be inserted into a pocket of the wristband, the pocket configured to support the mobile device. The method can further include inserting an interface portion of a card reader through a port hole formed through the wristband. The card reader can be attached to the mobile device such that the card reader is in data communication with the mobile device.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These aspects and others will be apparent from the following description of preferred embodiments and the accompanying drawing, which is meant to illustrate and not to limit the invention, wherein:

FIG. 1C is a side plan view of the wristband of FIG. 1A.

FIG. 1D is an enlarged side view of the stitch shown in FIG. 1C.

FIG. 3B is a three-dimensional, rear perspective view of the wristband of FIG. 3A.

FIG. 4B is a three-dimensional, rear perspective view of the wristband of FIG. 4A.

Unless otherwise noted, like reference numerals in the drawings may be used to denote the same or similar components.

DETAILED DESCRIPTION

Figure 1A:
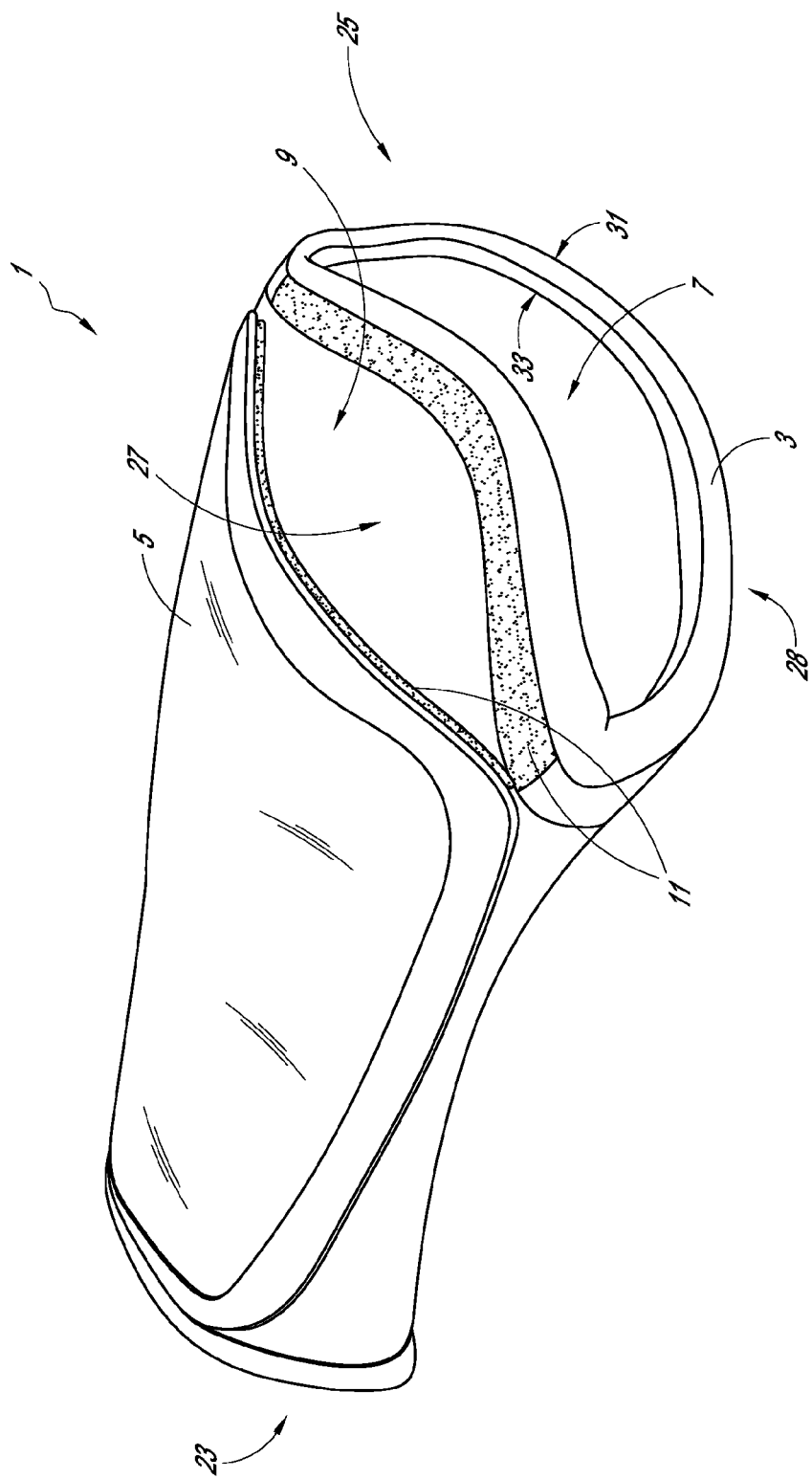
FIG. 1A is a three-dimensional, front perspective view of a wristband, according to one embodiment.

Various embodiments disclosed herein relate to a wristband configured to support a mobile device, such as a mobile smartphone, tablet computing device, and other types of mobile computing or electronic platforms. The embodiments disclosed herein can be implemented in conjunction with any suitable mobile device application. For example, in some embodiments, the wristband can be used to support a mobile payment processing system configured to process payments on the mobile device. As explained herein, a card reader can be attached to the mobile device and can enable the mobile device to process payments made by a payment card, such as a credit card, debit card, gift card, or any other suitable type of payment card. For example, a user can insert the card reader into an electronic port in the mobile device. Software on the mobile device can manage the operation of the card reader and process payments made using the card reader. Once the user electronically couples the card reader to the mobile device, the user can swipe a payment card through the card reader, which can read the payment card. The card reader can communicate the payment information to the mobile device, which can wirelessly communicate with one or more commercial transactions servers and can deduct the payment from an account associated with the payment card.

Because the mobile device and card reader are capable of processing payments made using a payment card, users can advantageously process payments when they are away from a conventional store or office. For example, street vendors, delivery services, and any other user that is away from a conventional store or office can utilize the mobile device and card reader to process payments without requiring a larger, desktop or laptop computer, or other payment processing device such as a cash register or a credit card processing machine. Because the user may use the mobile device to process payments in different types of environments and locations, it can be advantageous to provide a wearable apparatus adapted to support the mobile device and/or card reader.

For example, various embodiments disclosed herein include a wristband adapted to support mobile devices, such as mobile smartphones, table computing devices, and other types of mobile computing or electronic platforms. Advantageously, the user can wear the mobile device on his or her wrist such that the mobile device is positioned for easy access and use. For example, the user can wear the mobile device in a pocket of the wristband while he or she is working. Because the mobile device is attached to the wrist, the user can go about his or her daily work routine without having the mobile device interfere with the user's activities. When the user is ready to process a payment, the user can manipulate the wrist such that the mobile device and card reader are presented to the user. The user can swipe the payment card in the card reader and can use an interface on the mobile device, such as a touch screen interface, to complete the transaction using software stored on the mobile device.

Accordingly, the embodiments disclosed herein advantageously position the pocket supporting the mobile device on the wrist of the user. For example, wearing the mobile device on the wrist can be important in commercial situations because positioning the mobile device on, e.g., the upper arm (i.e., above or on the elbow) or other part of the body may be less accessible and reachable to the user in his or her daily routine. Thus, in some embodiments, the pocket and mobile device can be attached to an inner side of the wristband such that the mobile device is positioned on an anterior portion of the wrist, i.e., a portion of the wrist on the same side of the arm as the palm of the hand. The user can thereby easily access the mobile device during a commercial transaction, and, when not in us, the wristband can secure the mobile device and ensure that the mobile device does not interfere with the user's daily routine and schedule.

In some embodiments, the pocket of the wristband can be formed between a transparent screen and an elastic body, and the mobile device can be positioned in the pocket. The user can view a display on the mobile device and can manipulate an interface on the mobile device (e.g., a touchscreen interface) through the transparent screen. The wristband can include a port hole formed through the wristband. The port hole can be sized and shaped to permit access from the pocket to an interface portion of a card reader, e.g., a portion of the card reader that can be inserted into an electronic port of the mobile device. In various embodiments, the port hole can include a cut out formed in a corner of the transparent screen. In other embodiments, the port hole can be formed through the elastic body.

In various embodiments, the wristband can include a thumb hole formed near a distal end of the body. The user can insert his or her thumb through the wristband to further secure the wristband to the wrist. For example, the thumb hole can include a loop of elastic material through which the thumb may be inserted. In other embodiments, the thumb hole is a cut out of the material that forms the body of the wristband. The thumb hole can thus provide an additional mechanism for securing the wristband to the wrist and can advantageously provide a stable platform for supporting the mobile device. Moreover, the thumb hole can facilitate the positioning of the wristband at a desired position along the user's arm by making that position more intuitive and consistent.

In further embodiments, the wristband can include an access aperture adapted to provide access to the pocket. For example, the user can insert the mobile device into the pocket through the access aperture. In some embodiments, the access aperture can be formed between an exterior surface of the body and the transparent screen. In other embodiments, the access aperture can be formed through the thickness of the elastic body and can be positioned, e.g., between proximal and distal ends of the elastic body.

Accordingly, various embodiments for a wristband adapted to support a mobile device are disclosed herein. The wristbands disclosed herein can be suitable for wearing a mobile device when conducting commercial transactions, e.g., the mobile device can be positioned in a location that is easy to access by the user when the user is processing a payment, yet that is nevertheless positioned in a location that will not interfere with the user's daily activities when the mobile device is not in use.

Figure 1B:
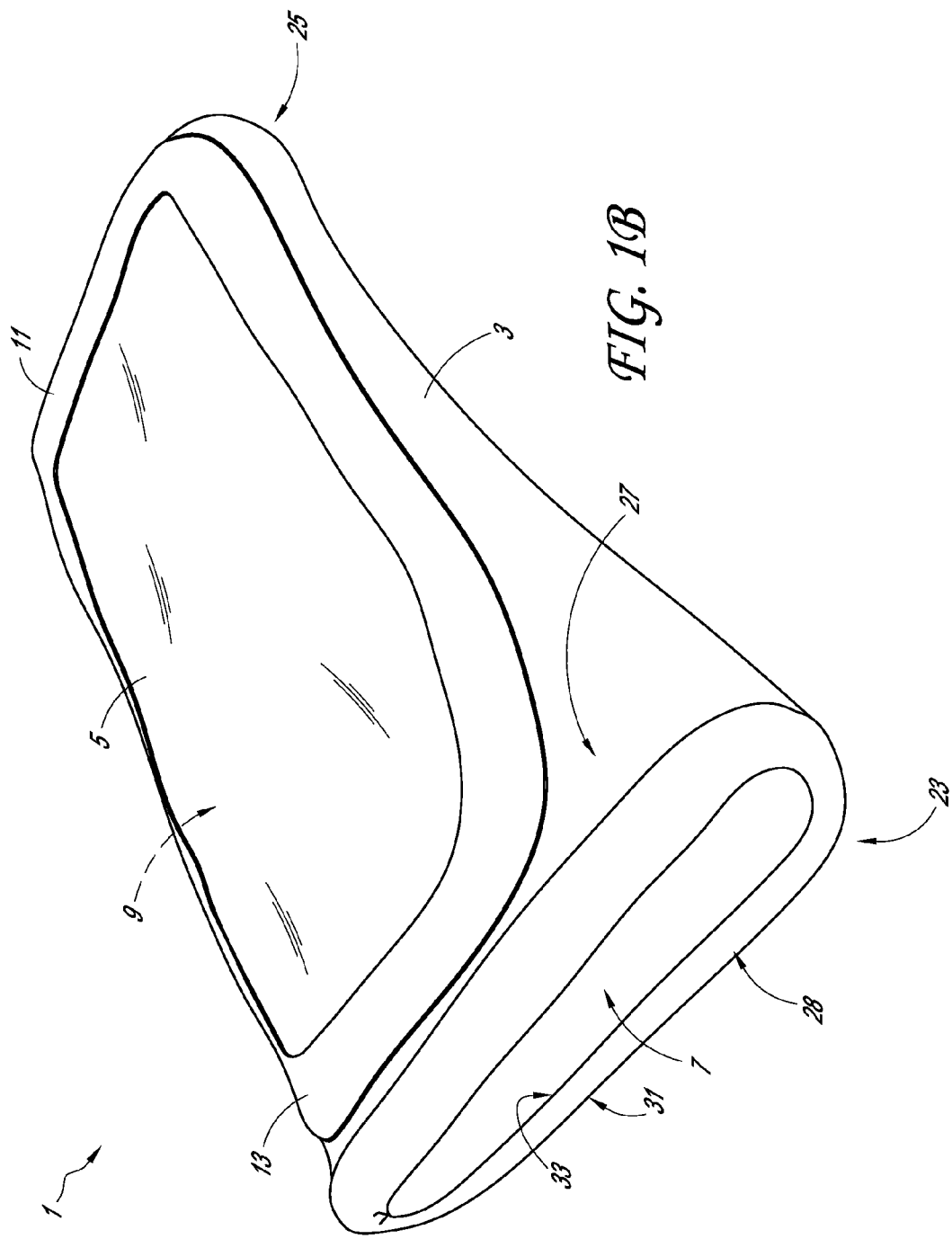
FIG. 1B is a three-dimensional, rear perspective view of the wristband of FIG. 1A.

FIG. 1A is a three-dimensional, front perspective view of a wristband 1, according to one embodiment. FIG. 1B is a three-dimensional, rear perspective view of the wristband 1 of FIG. 1A. FIG. 1C is a side plan view of the wristband 1 of FIG. 1A. The wristband 1 can include an elastic body 3, a transparent screen 5 coupled to the elastic body 3, and a pocket 9 between the screen 5 and the elastic body 3. The elastic body 3 can have an opening 7 sized for a human wrist. Accordingly, when a wrist is positioned through the opening 7, the elastic body 3 can conform and/or contract to attach to the user's wrist (see, e.g., FIG. 2B below). The elastic body 3 can include an interior surface 33 configured to face the wrist and an exterior surface 31 configured to face away from the wrist. In other embodiments (not shown), the wristband can include one or more additional layers interior of the interior surface 33, such as a lining of cotton or synthetic material for insulation and/or comfort. Furthermore, in various embodiments, the size of the opening 7 of the elastic body 3 can vary to accommodate different wrist sizes. For example, in some embodiments, the wristband 1 can be formed in extra small, small, medium, large, extra large sizes, etc. Thus, the elastic body 3 can define a tubular-shaped structure through which the wrist may pass.

The elastic body 3 can have a distal end 25 configured to be disposed nearer the user's hand and a proximal end 23 opposite the distal end 25 and configured to be disposed nearer the user's elbow. The elastic body 3 can also have an inner side 27 and an outer side 28. The inner side 27 of the elastic body 3 can be adapted to be disposed on an anterior portion of the wrist, i.e., on a palmar portion, or portion that is on the same side of the arm as the palm of the user's hand (see, e.g., FIG. 2B below). The outer side 28 of the elastic body 3 can be adapted to be disposed on a posterior portion of the wrist, i.e., on the side of the arm that is opposite the palm of the user's hand. In the illustrated embodiments, the screen 5 can be coupled to the inner side 27 of the elastic body 3, such that the mobile device can be disposed in the pocket 9 on the anterior portion of the wrist. In some embodiments, the outer side 28 of the elastic body 3 may be adapted to support any desirable markings, such as advertisements. In such embodiments, the advertisements can be formed using rubberized ink and a screen-printing process. Other suitable ways to form the markings (e.g., advertisements) are possible. By disposing advertisements on the outer side 28 of the elastic body 3, the available surface area of the body 3 can be utilized by the user and/or manufacturer to generate additional revenue using the wristband 1. In other embodiments (not shown), however, the screen 5 and pocket 9 can be coupled to the outer side 28 of the elastic body 3, such that the mobile device can be disposed on the posterior portion of the wrist.

The elastic body 3 can be formed of any suitable elastic material. For example, in some embodiments, the elastic body 3 can include a spacer fabric and/or neoprene, such as a breathable neoprene. An elastic body 3 formed of spacer fabric or breathable neoprene can be comfortable to wear and can allow users having different wrist diameters to wear the wristband 1. The elastic body 3 can be formed by shaping a substantially planar elastic sheet into an annular or tubular profile by attaching a first end of the sheet to a second end of the elastic sheet. The first and second ends of the sheet can be attached to form the elastic body 3 by a stitch 12, which can be a flat-lock stitch in some embodiments. For example, FIG. 1D is an enlarged side view of a flat-lock stitch used as the stitch 12 in FIG. 1C. Advantageously, the flat-lock stitch 12 (see FIGS. 1C and 1D) can be formed flat relative to the surface of the body 3 such that the stitch 12 does not itch or otherwise irritate the user's wrist, nor cause any protrusions in the surface of the elastic body 3. The thickness of the elastic sheet (and of the elastic body 3) can be any suitable thickness, e.g., in a range of about 1 mm to about 9 mm, more particularly in a range of about 3 mm to about 6 mm. In one embodiment, the thickness of the elastic body 3 can be about 3 mm. In some embodiments, the thickness of the material can vary in different portions of the elastic body, such as being thinner (e.g., about 0.5 mm to about 2 mm) in the portion of the elastic body 3 behind the screen 5.

The pocket 9 can be sized and shaped to receive any suitable mobile device, such as a smartphone. The mobile device can be supported in the pocket 9 between the screen 5 and the exterior surface 31 of the elastic body 3. The transparent screen 5 can be formed of any suitable optically transparent material, such as a clear plastic, e.g., vinyl. Because the screen 5 is visibly transparent, the user can see a display of the mobile device through the screen 5. Furthermore, the screen 5 can be configured such that the user can control the operation of the mobile device through the screen 5. For example, in some embodiments, the user can manipulate a touch screen interface of the mobile device through the screen 5.

The mobile device can be inserted into the pocket 9 by way of an access aperture 11. As shown in FIG. 1A, the access aperture 11 can provide access to the pocket 9 and can be disposed between the exterior surface 31 of the elastic body 3 and the screen 5. The access aperture 11 shown in FIG. 1A is in an open configuration such that the user can insert or remove the mobile device to and/or from the pocket 9. The wristband 1 can further include a fastener configured to fasten the access aperture into a closed configuration (shown in FIG. 1B) to secure the mobile device in the pocket 9. The fastener can be released to place the access aperture 11 in the open configuration shown in FIG. 1A. In various embodiments, a Velcro™ fastener can be used to move the access aperture 11 from the open configuration to the closed configuration, and vice versa. Skilled artisans will appreciate that other fasteners may be suitable to open and close the access aperture 11.

In the embodiment of FIGS. 1A-1C, the access aperture 11 can be formed at or near a first edge of the screen 5 that is near the distal end 25 of the elastic body 3. The other three edges of the screen 5 can be permanently secured to the inner side 27 of the elastic body 3 by way of a bond 13. The bond 13 can be any type of bond suitable to permanently join the screen 5 to the elastic body 3. For example, in some embodiments, a weld can be used; in other embodiments, any suitable type of stitch can be used. Skilled artisans will understand that there are still other ways to permanently join the screen 5 to the elastic body 3 along three edges of the body 3. When a mobile device is disposed in the pocket 9, as explained below, a card reader can be coupled to the mobile device through the access aperture 11. Accordingly, in the embodiment of FIGS. 1A-1C, an interface portion of the card reader can be inserted through the access aperture 11 and into an electronic port of the mobile device positioned in the pocket 9. In other embodiments, one or more port holes can be formed through the wristband 1, e.g., through the proximal end 23 of the elastic body 3, through the distal end 25 of the elastic body 3, or through lateral ends or edges of the elastic body 3. In some arrangements, port holes can be formed through any suitable portion of the screen 5.

Figure 2A:
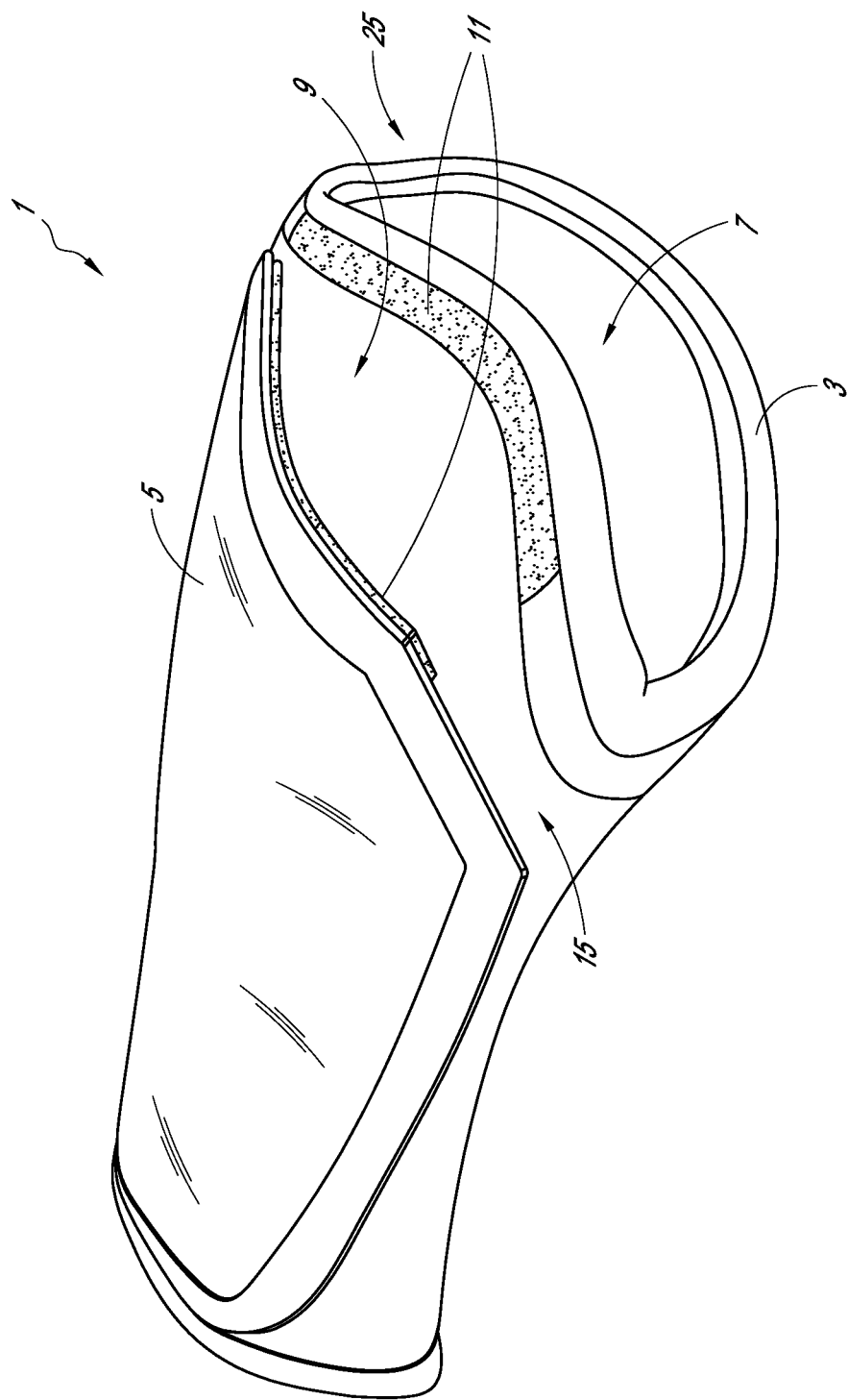
FIG. 2A is a three-dimensional, front perspective view of a wristband having a port hole near a distal end, according to another embodiment.
Figure 2B:
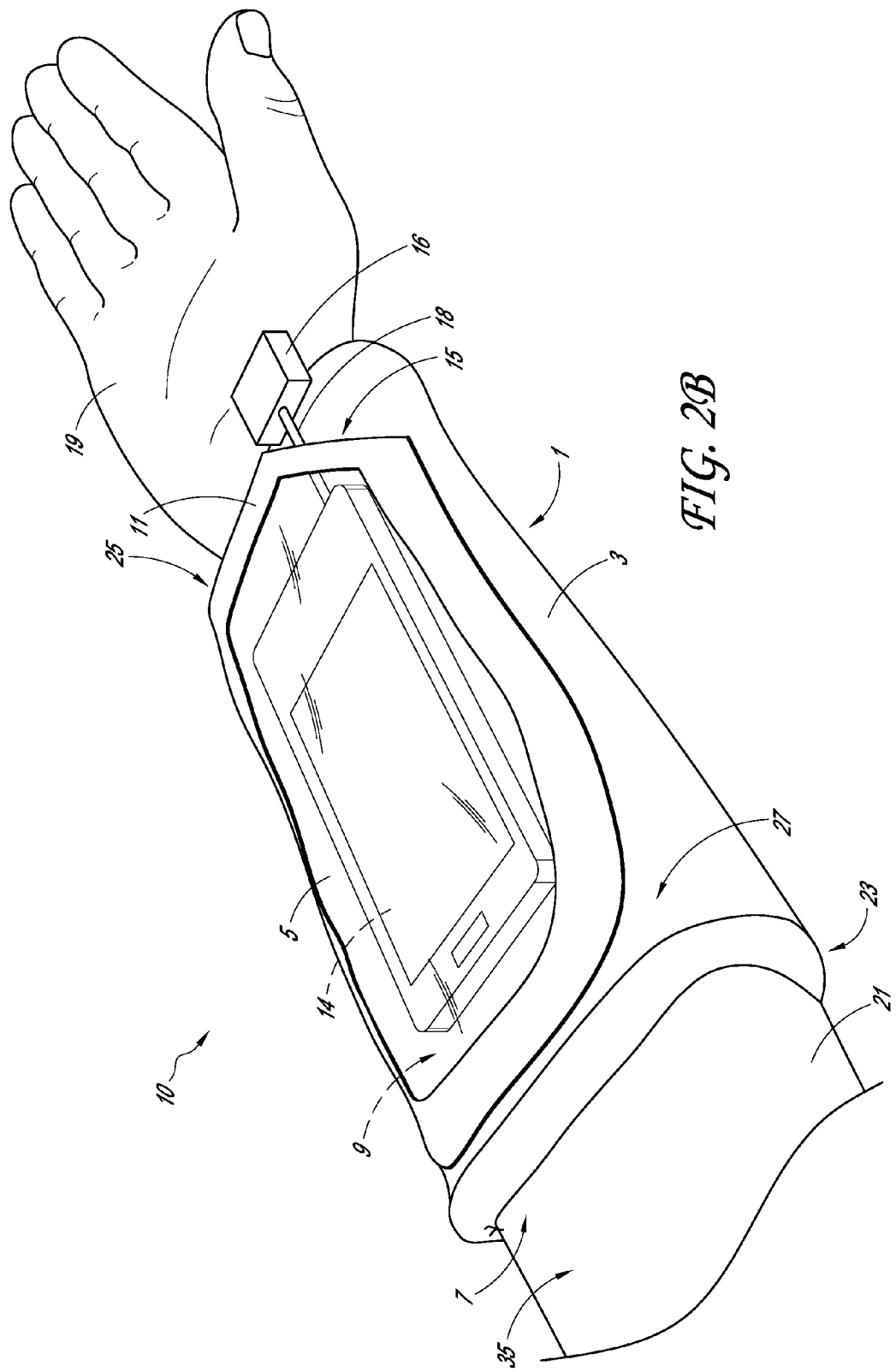
FIG. 2B is a three-dimensional, rear perspective view of a mobile payment system including the wristband of FIG. 2A, a mobile device, and a card reader.

FIG. 2A is a three-dimensional, front perspective view of the wristband 1 having a port hole 15 near the distal end 25 of the elastic body 3, according to another embodiment. FIG. 2B is a three-dimensional, rear perspective view of a mobile payment system 10 including the wristband 1 of FIG. 2A, a mobile device 14, and a card reader 16. Unless otherwise noted, reference numerals in FIGS. 2A and 2B represent the same or similar component as the reference numerals in FIGS. 1A-1C. For example, as in FIGS. 1A-1C, the wristband 1 can include the elastic body 3, the transparent 5 screen coupled to the elastic body 3, and the pocket 9 between the screen 5 and the elastic body 3. Furthermore, as shown in FIG. 2A, the access opening 11 can be formed near the distal end 25 of the elastic body 3.

As shown in FIG. 2B, a wrist 21 of a user can be inserted through the opening 7 of the wristband 1, and the elastic body 3 can conform closely about the wrist 21. The user can insert the mobile device 14 into the pocket 9 by way of the access opening 11. As above, the user can close the access opening 11 using any suitable fastener (e.g., Velcro™). The pocket 9 and the screen 5 can be disposed on the inner side 27 of the elastic body 3 such that the mobile device 14 will be positioned on an anterior portion 35 of the wrist 21 (e.g. a portion 35 of the wrist 21 on the same side of the arm as the palm of a hand 19). Advantageously, wearing the mobile device 14 on the anterior portion 35 of the wrist 21 can enable the user to easily access and manipulate the mobile device 14 when processing a payment, while preventing the mobile device 14 from interfering with the user's other activities. In other embodiments, however, the mobile device 14 can be worn on the posterior portion of the wrist 21.

In addition, unlike the embodiment of FIGS. 1A-1C, the wristband 1 of FIGS. 2A-2B includes a port hole 15 formed through the wristband 1. For example, as shown in FIGS. 2A-2B, the port hole 15 can comprise a diagonal cut-out formed at or near a corner of the screen 5. In FIGS. 2A-2B, the port hole 15 is illustrated near the distal end 25 of the elastic body 3. The port hole 15 can enable the user to insert an interface portion 18 of the card reader 16 through the port hole 15 to attach to an electronic port of the mobile device 14. Thus, the access aperture 11 can be fastened closed to secure the mobile device 14 in the pocket 9. The port hole 15 can allow the card reader 16 to be disposed outside the pocket 9 so that the user can swipe payment cards using the card reader 16, while remaining in electronic and/or data communication with the mobile device 14 by way of the interface portion 18.

Although the port hole 15 is formed in the screen 5 near the distal end 25 of the elastic body 3 in FIGS. 2A-2B, the port hole 15 can instead be located at any suitable location in the wristband 1 that would correspond to the desired data port on the mobile device 14. For example, in some embodiments, the port hole 15 can be formed through the proximal end 23 or the distal end 25 of the elastic body 3 and/or through lateral edges of the body 3, and/or through the screen 5 at or near the proximal end 23 or distal end 25 of the elastic body 3. In various embodiments, the wristband 1 can include numerous port holes to allow other peripheral devices (e.g., power supplies, audio input/output, etc.) to communicate through the wristband 1 to the mobile device 14 in the pocket 9. The card reader 16 can be any suitable payment card reader, and the interface portion 18 can be any suitable electronic interface configured to electronically couple the card reader 16 with the mobile device 14. For example, in some embodiments, the card reader 16 can be a suitable card reader provided by Square, Inc., of San Francisco, Calif.

Figure 2C:
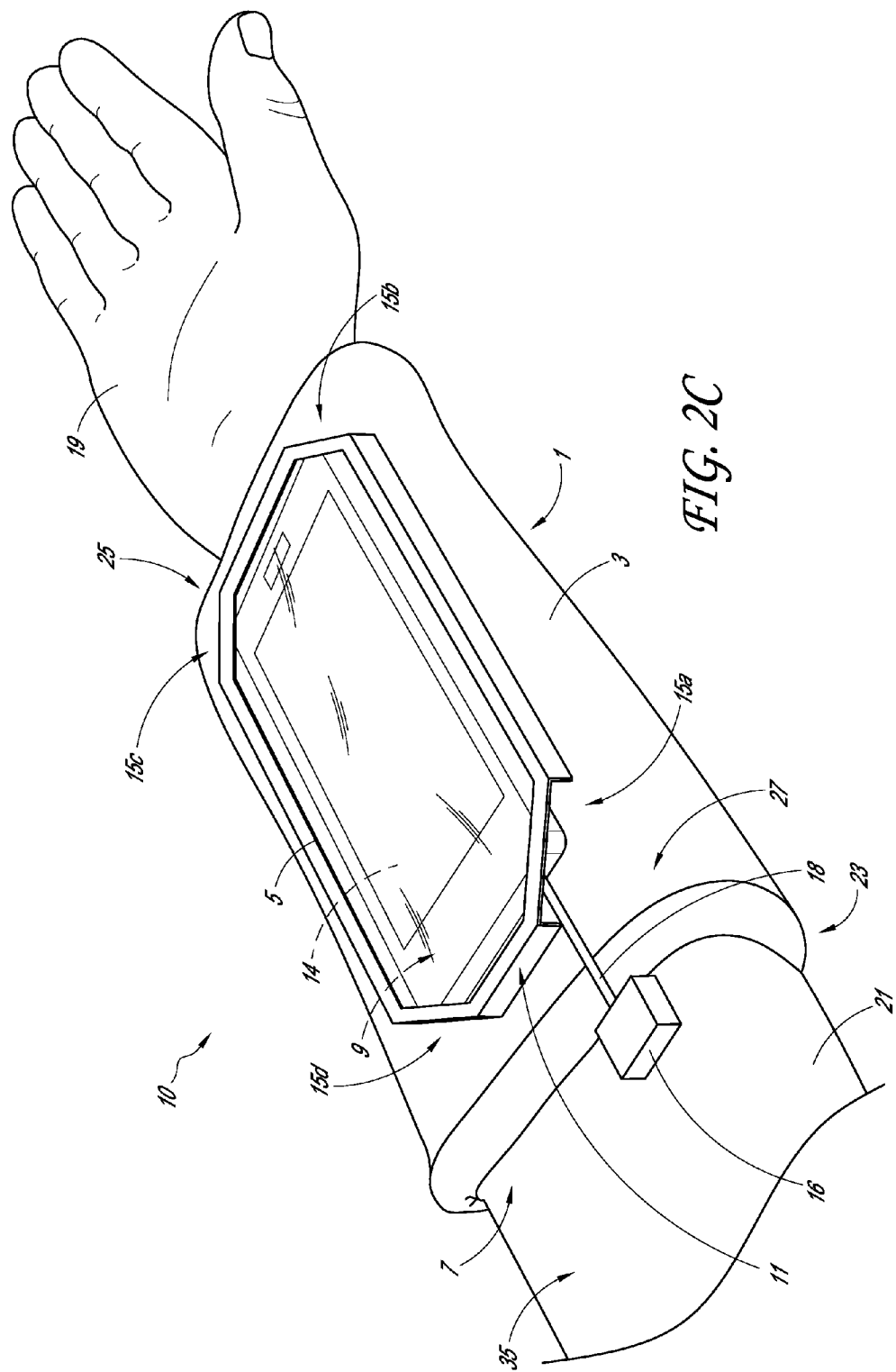
FIG. 2C is a three-dimensional, rear perspective view of a mobile payment system according to another embodiment.

FIG. 2C is a three-dimensional, rear perspective view of a mobile payment system 10 according to another embodiment. Unless otherwise noted, reference numerals in FIG. 2C represent the same or similar component as the reference numerals in FIGS. 1A-1C and 2A-2B. The transparent screen 5 can be formed to enclose the mobile device 14, e.g., to enclose five sides of the mobile device 14. For example, the transparent screen 5 can include a plurality of walls extending outwardly from the elastic body 3 at a height that is at least as large as a thickness of the mobile device 14. The transparent screen can include a generally planar upper portion that extends between the walls over the upper surface of the mobile device 14.

In the wristband 1 shown in FIG. 2C, the access aperture 11 can be disposed near the proximal end 23 of the elastic body 3 along one of the walls of the transparent screen 5. The access aperture 11 can have an open configuration in which the mobile device 14 can be inserted through the access aperture 11 into the pocket 9. In a closed configuration (as shown in FIG. 2C), the access aperture 11 can enclose and secure the mobile device 14 within the pocket 9. The access aperture 11 can include any suitable fastener, such as Velcro™. Furthermore, as shown in FIG. 2C, the wristband 1 can include four port holes 15a-15d formed at corners of the transparent screen 5. The port holes 15a-15d can comprise diagonal cutouts formed through the walls of the transparent screen 5. The corners of the mobile device 14 can pass through and rest against the port holes 15a-15d. Disposing the corners of the mobile device 14 through the port holes 15a-15d can advantageously stabilize the mobile device 14 within the pocket 9 such that the mobile device 14 does not shift or move during operation by the user. Furthermore, various electronic interfaces associated with the payment system 10 can pass through any of the port holes 15a-15d. For example, as shown in FIG. 2C, the interface portion 18 of the card reader 16 can pass through the port hole 15a to attach to an electronic port of the mobile device 14.

Figure 3A:
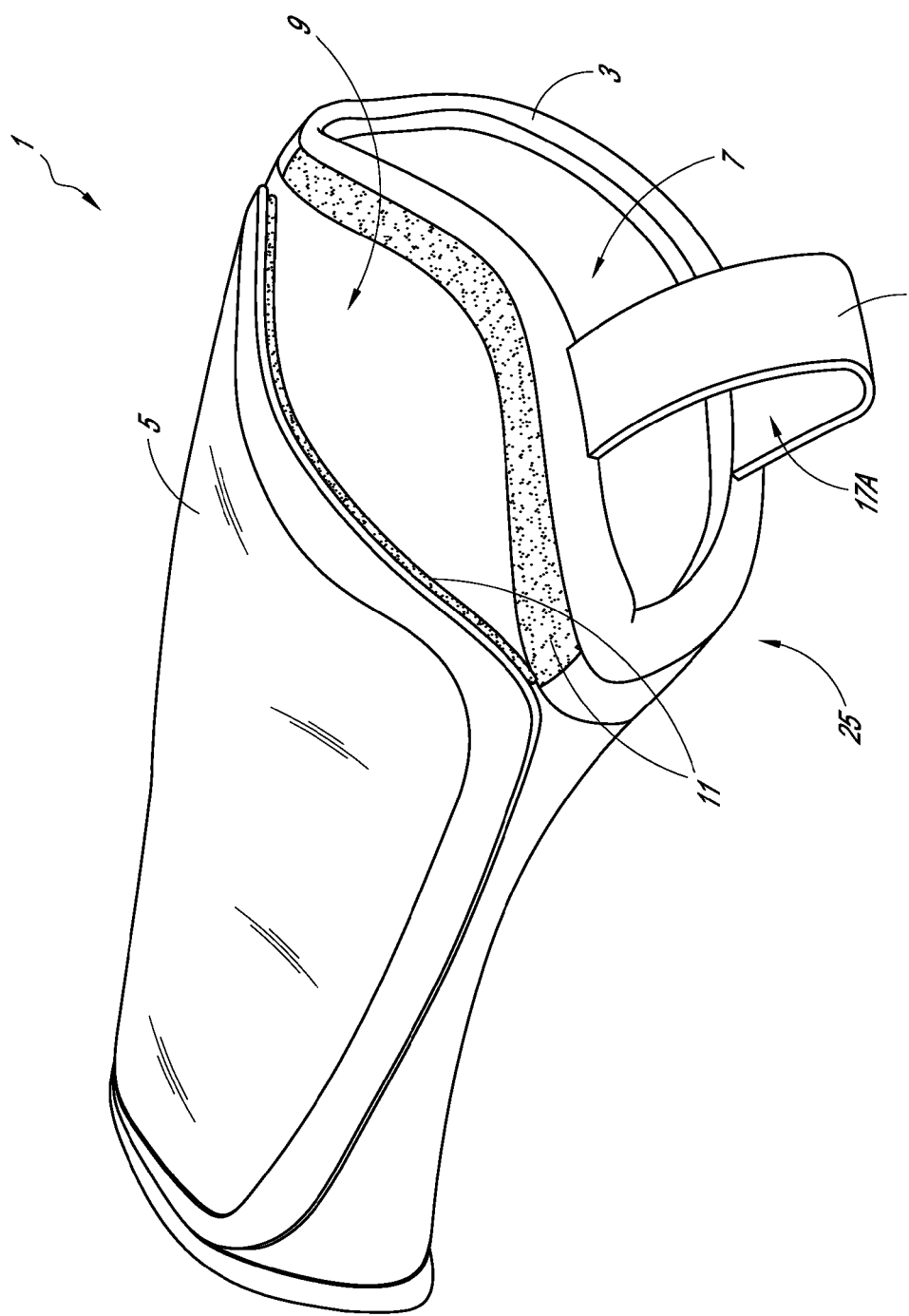
FIG. 3A is a three-dimensional, front perspective view of a wristband having a thumb hole, according to yet another embodiment.

FIG. 3A is a three-dimensional, front perspective view of a wristband having a thumb hole 17A, according to yet another embodiment. FIG. 3B is a three-dimensional, rear perspective view of the wristband 1 of FIG. 3A. Unless otherwise noted, reference numerals in FIGS. 3A and 3B represent the same or similar component as the reference numerals in FIGS. 1A-1C and 2A-2B. For example, as above, the wristband 1 can include the elastic body 3, the transparent screen 5, and the pocket 9 between the screen 5 and the body 3. The screen 5 can be joined to the elastic body 3 along multiple edges of the screen 5 through the bond 13.

Figure 3C:
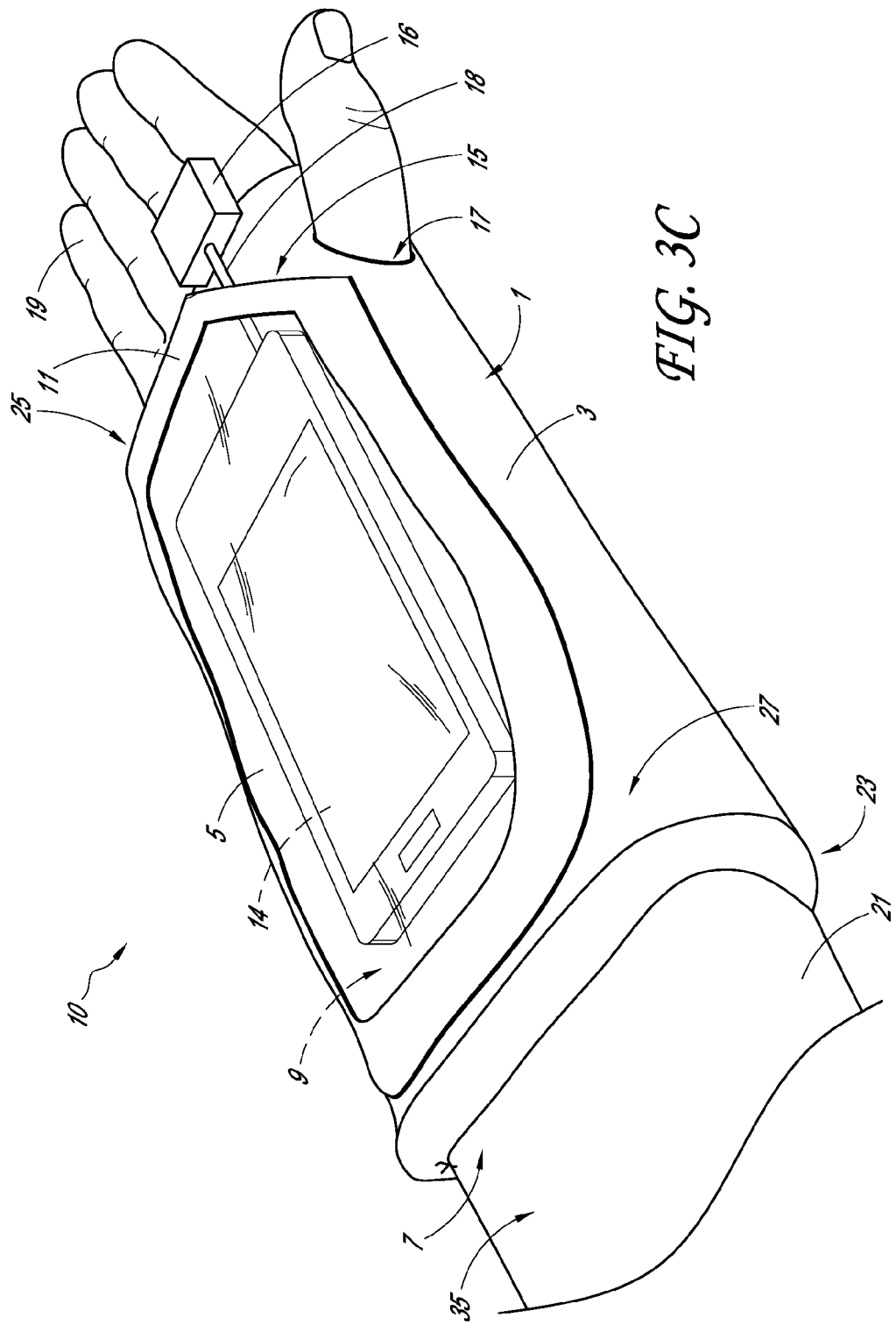
FIG. 3C is a three-dimensional, rear perspective view of a wristband having a thumb hole, according to another embodiment.

It should be appreciated that, during some activities, the wristband 1 of FIGS. 1A-2B may shift or rotate relative to the wrist of the user. Shifting or rotation of the wristband 1 during use can be uncomfortable to the user and/or can interfere with the user's activities. Accordingly, it can be advantageous to further secure the wristband 1 to the wrist of the user to prevent the wristband 1 from moving relative to the wrist during use. One way to further secure the wristband 1 is illustrated in FIGS. 3A-3B. As shown in FIGS. 3A-3B, the wristband 1 can further include a thumb hole 17A near the distal end 25 of the elastic body 3. The thumb hole 17A can be formed by a loop 17B of material, such as elastic material or other material that is comfortable and durable, extending from the elastic body 3. In other embodiments, such as that shown in FIG. 3C, a thumb hole 17 can be formed by an opening in the elastic body 3.

The thumb hole 17, 17A can be sized and shaped to receive a thumb of the user. During use, therefore, the user can insert his or her wrist through the opening 7 of the wristband 1 and can insert the thumb through the thumb hole 17, 17A. The thumb hole 17, 17A can act to stabilize and further secure the wristband 1 to the wrist of the user. Accordingly, when the user moves about during use, the thumb hole 17, 17A can prevent lateral shifting of the wristband 1 along the wrist or arm of the user, e.g., can prevent lateral translation of the wristband 1 along the wrist. Further, the thumb hole 17, 17A can prevent rotation of the wristband 1 about the wrist. Thus, the thumb hole 17, 17A near the distal end 25 of the elastic body 3 can advantageously secure the wristband 1 to the wrist to prevent the wristband from shifting during use and interfering with the user's activities. The thumb hole 17, 17A can be positioned on either side of the distal end 25 of the elastic body 3 to accommodate a user's left or right hands. In some embodiments, the elastic body 3 can have a thumb hole on both sides so that the user can use the same wristband 1 on either hand and make use of the thumb hole 17, 17A feature for either hand.

Figure 4A:
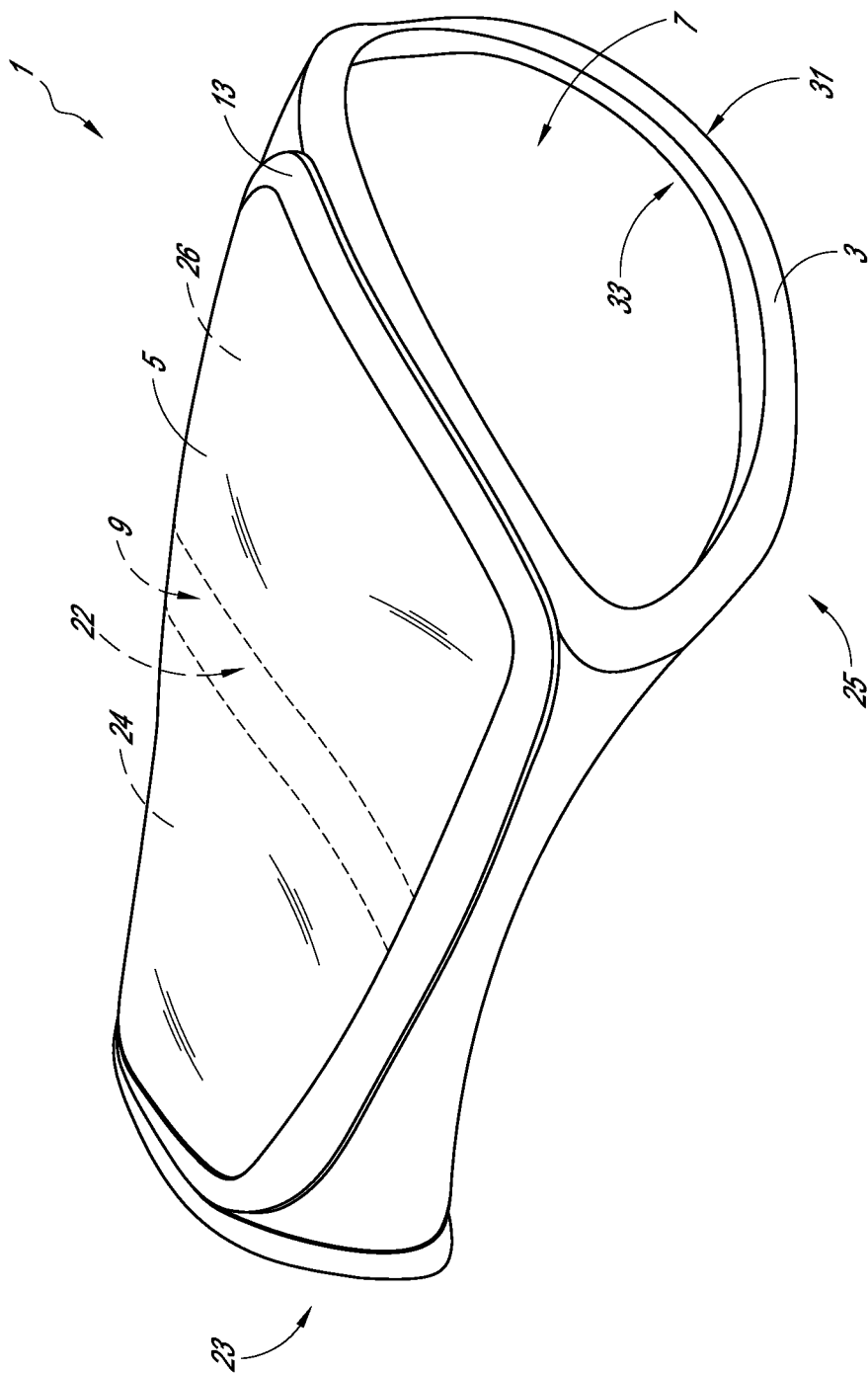
FIG. 4A is a three-dimensional, front perspective view of a wristband having an access aperture formed through a thickness of an elastic body, according to another embodiment.

FIG. 4A is a three-dimensional, front perspective view of a wristband 1 having an access aperture 22 formed through a thickness of the elastic body 3, according to another embodiment. FIG. 4B is a three-dimensional, rear perspective view of the wristband 1 of FIG. 4A. Unless otherwise noted, reference numerals in FIGS. 4A and 4B represent the same or similar component as the reference numerals in FIGS. 1A-1C, 2A-2B, and 3A-3B. For example, as above, the wristband 1 can include the elastic body 3, the transparent screen 5, and the pocket 9 between the screen 5 and the elastic body 3. Unlike the embodiments of FIGS. 1A-3B, however, the access aperture 22 can be formed through a thickness of the elastic body 3, not between the screen 5 and the body 3 as shown in FIGS. 1A-3B. Accordingly, in the embodiment of FIGS. 4A-4B, a perimeter of the screen 5 can be permanently joined to the elastic body 3 (e.g., the inner side 27 of the elastic body 3) by way of the bond 13, which can be a weld, stitch, adhesive or any other suitable joining mechanism. Thus, the perimeter of the screen 5 can be sealed to the elastic body 3 in the embodiment of FIGS. 4A-4B.

To position the mobile device in the pocket 9, the access aperture 22 can be formed through the elastic body 3 between the distal end 25 and the proximal end 23 of the elastic body. For example, a slot can be formed from the interior surface 33 of the body 3 through the thickness of the body 3 to the exterior surface 31 of the body 3. The access aperture 22 can therefore divide the inner side 27 of the elastic body 3 into a first segment 24 and a second segment 26. To insert the mobile device into the pocket 9, the user can insert one end of the mobile device through the access aperture 22 between the screen 5 and the first segment 24 (or the second segment 26), and can then insert the other end of the mobile device through the access aperture 22 between the screen 5 and the second segment 26 (or the first segment 24). In some embodiments, the access aperture 22 can be positioned nearer the proximal end 23 so that the device may be inserted or removed more conveniently from the pocket 9 through the access aperture 22 while the user is wearing the wristband 1, such as by pulling the first segment 24 away from the arm or rolling the first segment 24 inside out to permit access to the access aperture 22.

Advantageously, with the embodiment of FIGS. 4A-4B, the access aperture 22 can permit insertion of the mobile device into the pocket 9 while enabling a permanent bond 13 or joint to be applied about the entire perimeter of the screen 5. Providing a permanent bond 13 around all or substantially all of the perimeter of the screen 5 to join the screen 5 to the elastic body 3 can allow for a more secure pocket 9 for supporting the mobile device and reduces the risk that the device could escape from the pocket 9 with a sudden or forceful movement of the user's arm. In addition, as above, the wristband 1 can include one or more port holes formed through the wristband 1 to allow for one or more electronic components (e.g., a card reader, power supply, or any other suitable component) to communicate with a mobile device positioned in the pocket 9 by way of, e.g., associated wires or cords.

Figure 5:
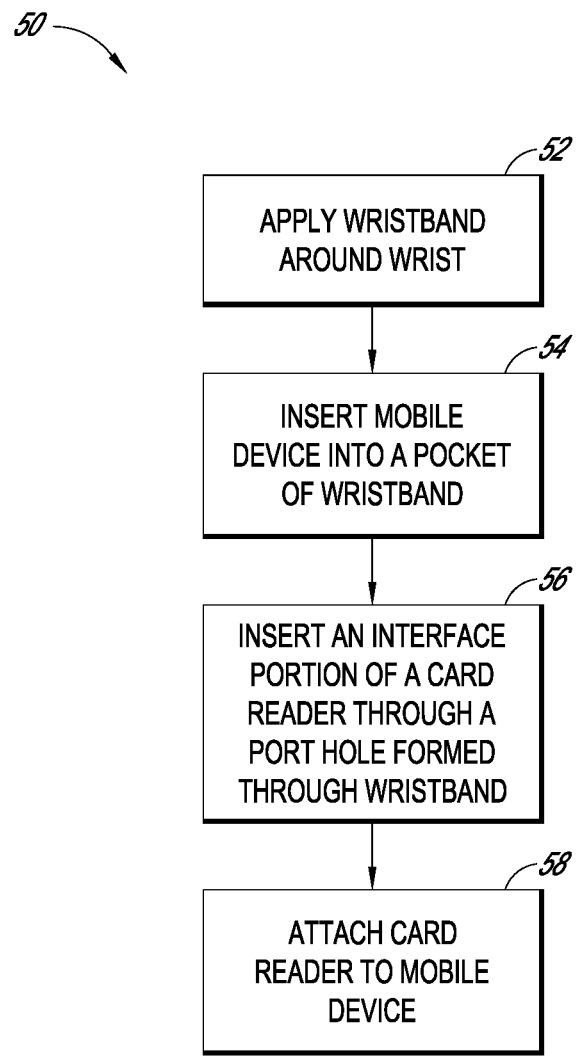
FIG. 5 is a flowchart illustrating a method for processing a payment using a mobile device, according to one embodiment.

FIG. 5 is a flowchart illustrating a method 50 for processing a payment using a mobile device, according to one embodiment. It should be appreciated that, although the method 50 is illustrated in a particular sequence in FIG. 5, the order of the steps of the method 50 can vary. The method 50 begins in a block 52 to apply a wristband around a wrist of a user. For example, as explained herein, the user can insert his or her wrist through an opening in an elastic body. Upon insertion of the wrist through the opening of the body, the elastic body can contract and/or conform to the wrist to secure the wristband to the wrist. The elastic body can be formed of any suitable elastic material, such as neoprene. In some embodiments, the user can also insert a thumb into a thumb hole of the wristband to further secure the wristband to the wrist.

The method 50 moves to a block 54, wherein a mobile device is inserted into a pocket of the wristband. As above, the pocket can be formed between a transparent screen and the elastic body. The pocket can be sized and shaped to receive any suitable mobile device, e.g., a mobile smartphone, tablet computing device, or any other suitable computing or electronic platform. The pocket can be formed on any suitable side of the elastic body. For example, the pocket can be formed on an inner side of the elastic body configured to be disposed on an anterior portion of the wrist. In other embodiments, the pocket can be disposed on a posterior portion of the wrist. The transparent screen can enable the user to view and control the mobile device when the mobile device is positioned in the pocket.

In a block 56, an interface portion of a card reader is inserted through a port hole formed through the wristband. As explained above, the card reader can be used to swipe a payment card to initiate a payment. Because the card reader is used to swipe a payment card, the card reader itself may be disposed outside the pocket. To permit electronic communication between the card reader and the mobile device, the port hole in the wristband allows the interface portion to pass through the wristband to connect the card reader and the mobile device.

Moving to a block 58, the card reader can be attached to the mobile device. For example, the user can insert the interface portion of the card reader into a suitable electronic port in the mobile device. The user can operate the mobile device by way of a user interface (e.g., a touch screen interface). After swiping the payment card, the user can process the payment using the mobile device to send and receive payment information to and from suitable payment servers.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is

1. A wristband for supporting mobile devices, the wristband comprising:
    an elastic body having an opening sized such that the elastic body securely conforms to a human wrist when the wrist is positioned in the opening, the elastic body having a distal end, a proximal end, an inner side adapted to be disposed on an anterior portion of the wrist, an outer side adapted to be disposed on a posterior portion of the wrist, an interior surface configured to face the wrist, and an exterior surface configured to face away from the wrist;

a transparent screen coupled to the elastic body;

a pocket between the screen and the elastic body, the pocket sized and shaped to receive a mobile device;

a port hole formed through the wristband, the port hole sized and shaped to permit access from the pocket to an interface portion of a card reader that is configured to read a payment card and to electronically communicate with the mobile device to process a payment made using the payment card; and an access aperture that provides access to the pocket.

2. The wristband of claim 1, wherein the transparent screen is coupled to the inner side of the elastic body, and the pocket is disposed between the transparent screen and the inner side of the elastic body.

3. The wristband of claim 2, wherein the transparent screen comprises a plurality of walls extending outwardly from the elastic body and an upper portion extending between the plurality of walls.

4. The wristband of claim 1, wherein the elastic body further includes a thumb hole formed near the distal end of the elastic body, the thumb hole sized and shaped to receive a thumb of a hand to further secure the elastic body to the wrist.

5. The wristband of claim 1, wherein the access aperture is disposed between the exterior surface of the elastic body and a first edge of the transparent screen near the proximal end or the distal end of the elastic body.

6. The wristband of claim 5, wherein the transparent screen is permanently joined along substantially all of a perimeter of the transparent screen except for the first edge.

7. The wristband of claim 1, wherein the access aperture is formed through a thickness of the elastic body.

8. The wristband of claim 7, wherein the access aperture is formed between the proximal and distal ends of the elastic body, and wherein substantially all of a perimeter of the transparent screen is permanently joined to the elastic body.

9. The wristband of claim 1, further comprising a fastener configured to close the access opening when the mobile device is in the pocket.

10. The wristband of claim 1, wherein the port hole is formed near the distal end of the elastic body.

11. The wristband of claim 10, wherein the port hole comprises a cut-out defined near a corner of the transparent screen.

12. The wristband of claim 1, wherein the elastic body comprises a substantially planar elastic sheet having a first end and a second end opposite the first end, the elastic sheet shaped to form a tubular profile by attaching the first end to the second end.

13. The wristband of claim 12, wherein a flat-lock stitch couples the first end to the second end.

14. The wristband of claim 1, wherein the elastic body comprises a spacer fabric.

15. The wristband of claim 1, wherein the elastic body has a thickness in a range of about 1 mm to about 9 mm.

16. The wristband of claim 1, further comprising a plurality of electronic port holes formed through the wristband, each electronic port hole sized and shaped to receive one or more wires to be coupled to the mobile device.

17. The wristband of claim 1, further comprising
a thumb hole formed near the distal end of the elastic body, the thumb hole sized and shaped to receive a thumb of a hand to further secure the elastic body to the wrist.

18. A method for processing a payment using a mobile device, the method comprising:

applying a wristband around a human wrist, the wristband comprising:

an elastic body having an opening sized such that the elastic body securely conforms to a human wrist when the wrist is positioned in the opening, the elastic body having a distal end, a proximal end, an inner side adapted to be disposed on an anterior portion of the wrist, an outer side adapted to be disposed on a posterior portion of the wrist, an interior surface configured to face the wrist, and an exterior surface configured to face away from the wrist;

a transparent screen coupled to the elastic body;

a pocket between the screen and the elastic body, the pocket sized and shaped to receive the mobile device;

a port hole formed through the wristband, the port hole sized and shaped to permit access from the pocket to an interface portion of a card reader that is configured to read a payment card and to electronically communicate with the mobile device to process a payment made using the payment card; and an access aperture that provides access to the pocket;

inserting the mobile device into the pocket of the wristband, the pocket configured to support the mobile device;

inserting the interface portion of the card reader through the port hole formed through the wristband; and attaching the card reader to the mobile device such that the card reader is in data communication with the mobile device.

19. The method of claim 18, further comprising swiping a payment card with the card reader to initiate a payment.

20. The method of claim 19, further comprising processing the payment with the mobile device, wherein processing the payment comprises operating a touch screen interface of the mobile device through a transparent screen that at least in part defines the pocket.

21. The method of claim 18, wherein applying the wristband comprises inserting the wrist through an opening in an elastic body, the elastic body sized to securely contract about the human wrist.

* * * * *